UNITED STATES PATENT OFFICE.

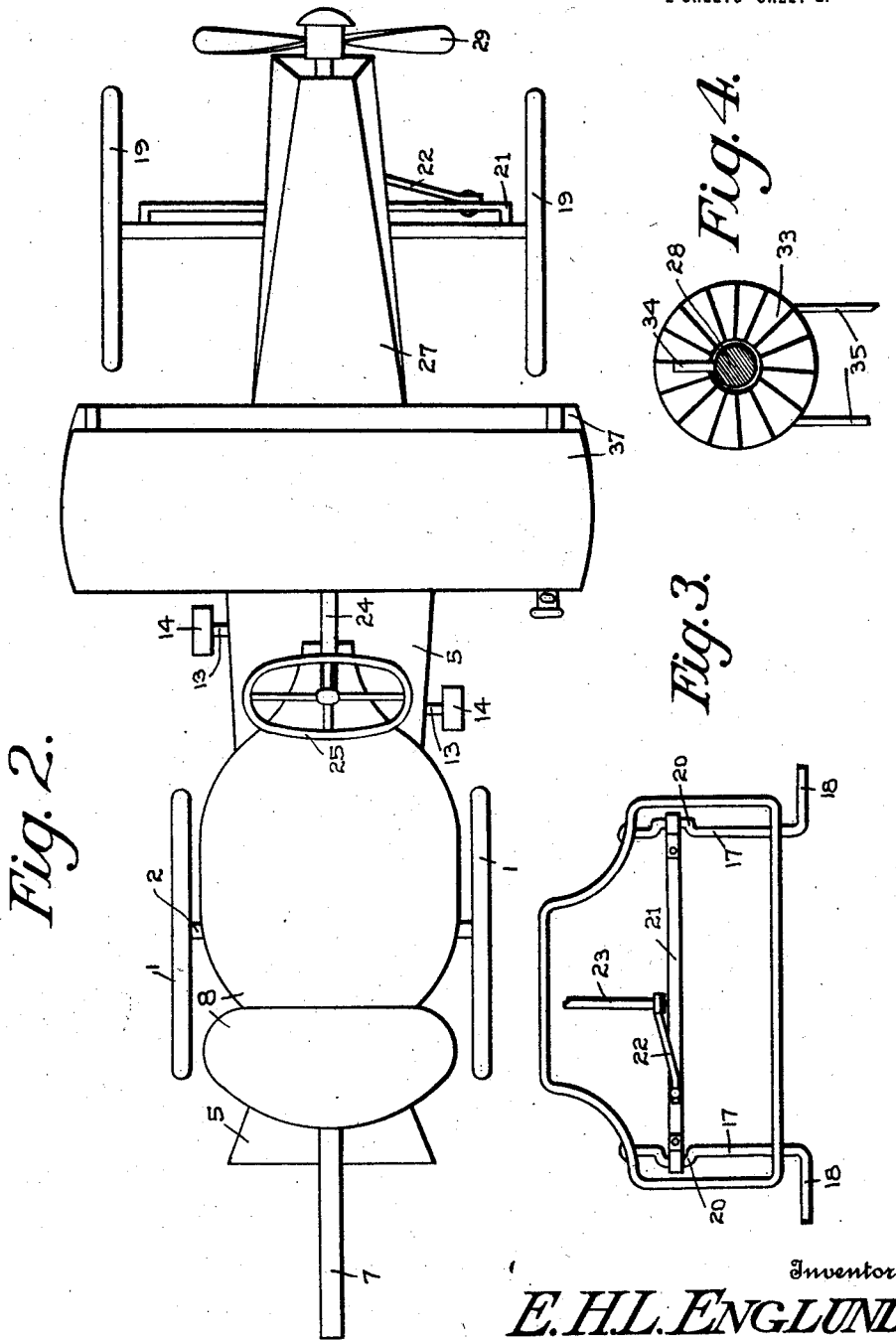

EDWIN H. L. ENGLUND, OF MUSKEGON, MICHIGAN.

TOY VEHICLE.

1,387,535.  Specification of Letters Patent.  Patented Aug. 16, 1921.

Application filed July 12, 1920. Serial No. 395,800.

*To all whom it may concern:*

Be it known that I, EDWIN H. L. ENGLUND, a citizen of the United States, residing at Muskegon, in the county of Muskegon and State of Michigan, have invented a new and useful Toy Vehicle, of which the following is a specification.

This invention relates to toy vehicles, one of its objects being to provide a vehicle of this character simulating an aeroplane and which has simple and efficient means for propelling the vehicle, said propelling means also operating mechanism for automatically spinning a propeller supported in front of the vehicle.

A further object is to provide a vehicle in which the tail plane or rudder constitutes a support for the seat of the driver.

Another object is to provide a device of this character which is simple and durable in construction, light and compact.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Fig. 2 is a plan view.

Fig. 3 is a front elevation of the steering mechanism.

Fig. 4 is an enlarged section on line 4—4, Fig. 1.

Figure 1:
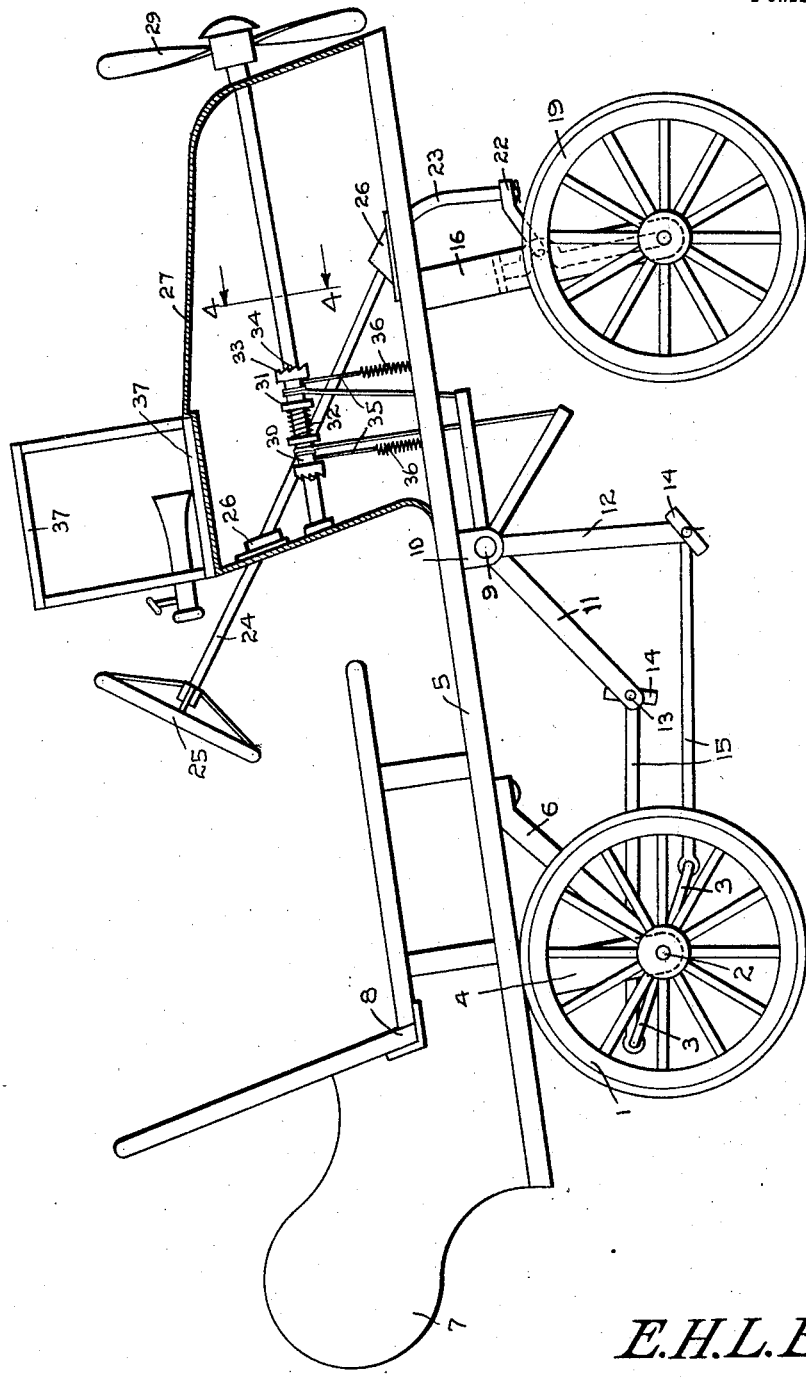
Figure 1 is a view partly in side elevation and partly in section of the vehicle.

Referring to the figures by characters of reference 1 designates the rear supporting wheels of the vehicle, the same being secured to an axle 2 having oppositely extending cranks 3. This axle is journaled in hangers 4 extending downwardly from a strip 5 constituting the bottom of the body of the vehicle. Suitable braces 6 may be used to connect this strip 5 to the hangers 4. A wing 7 simulating the rudder of an aeroplane is mounted on the rear portion of the strip 5 and constitutes a support for a seat 8 adapted to be occupied by the user of the vehicle.

A cross rod 9 is supported in bearings 10 extending downwardly from the strip 5 and on this cross rod are mounted the bell cranks 11 and 12. Each bell crank has a downwardly extending arm provided with a pivot boss 13 on which is mounted a pedal 14. This boss 13 constitutes a connection between the bell crank and a pitman 15 which is connected to one of the cranks 3.

The upper arms of the bell cranks are extended forwardly under the body of the vehicle.

Secured to the front portion of the strip 5 is a bolster 16 in the form of a frame as shown particularly in Fig. 3, there being vertical crank shafts or spindles 17 journaled in the side portions of the bolster and having a laterally extending arm 18 at their lower arms on which are journaled the front wheels 19 of the vehicle. The cranks 20 of the spindles or stems 17 are connected by a cross strip 21 and pivotally attached to this strip is a link 22 engaged by a crank arm 23 provided at the lower forward end of an inclined steering post 24. This steering post has a wheel 25 or the like at its upper rear end and may be journaled within bearings 26 arranged within a hood 27 mounted on the front portion of the strip 5. Thus it will be seen that by rotating the steering post 24 the wheels 19 can be turned to the right or to the left, thereby to steer the vehicle.

A longitudinal shaft 28 is journaled in the hood and is provided at its front end with a propeller 29.

Loosely mounted on the shaft 28 are spaced spools 30 and 31 between which is interposed a coiled spring 32. On the outer ends of these spools are provided ratchet teeth as indicated at 33 and extending from the shaft 28 are lugs 34 coöperating with the respective series of ratchet teeth. The spring 32 serves to hold the ratchet faces of the spools normally pressed against these lugs. Secured to each of the spools is a cord or tape 35 adapted to be wound thereon, one end of the cord being connected to a spring 36 which is secured to the strip 5 while the other end of the cord is connected to the upper arm of one of the bell cranks 11 and 12.

The ratchet teeth on the spools are so arranged that when one of the cords 35 is pulled downwardly one of the teeth on its spool will thrust against the lug 34 in the path thereof and cause the shaft 28 to rotate with the spool while the other lug will slip past the teeth on the other spool. When, however, the other cord 35 is pulled downwardly the operation will be reversed but, obviously, the shaft 28 will be rotated in the same direction and will thus cause the propeller 29 to be spun.

The occupant of the vehicle is mounted on the seat 8 and places the feet on the pedals 14. By oscillating these pedals backwardly and forwardly the rear axle 2 will be rotated and the vehicle will be driven forward. At the same time the bell cranks will pull downwardly alternately on the cords 35, so as to spin the shaft 28 and propeller 29 as before described.

It is to be understood that other mechanism than that described may be used for spinning the shaft.

It is to be understood that superposed frames 37 simulating the frames of an aeroplane can be mounted upon the rear portion of the hood as shown.

What is claimed is:

1. A toy vehicle including a body, supporting wheels, a crank axle revoluble with the rear supporting wheels, bell cranks mounted for oscillation, means for transmitting motion therefrom to the crank axle, operating pedals connected to the bell cranks, a propeller, a shaft therefor, and means operated alternately by the bell cranks for spinning the propeller and its shaft.

2. A toy vehicle including a body, supporting wheels, a crank axle revoluble with the rear supporting wheels, means for turning the front supporting wheels to steer the vehicle, bell cranks mounted for oscillation, connections between the bell cranks and the crank axle, foot pedals connected to the bell cranks, a propeller shaft, a propeller, and means operated by the bell cranks for spinning the propeller and its shaft during the actuation of the crank axle.

3. In a toy vehicle the combination with a body, front and rear supporting wheels, a crank axle revoluble with the rear wheels, and means for turning the front wheels to steer the vehicle, of bell cranks, pedals connected thereto, means operated by the bell cranks for rotating the crank axle, a propeller, means operated by the bell cranks for spinning the propeller, means projecting from the body for simulating the rudder of an aeroplane, and a seat supported by said means and adjacent the pedals.

In testimony that I claim the foregoing as my own, I have hereto affixed my signature in the presence of two witnesses.

EDWIN H. L. ENGLUND.

Witnesses:
 JOHN LILLMARS,
 PETER W. LOSBY.